United States Patent
Yang et al.

(10) Patent No.: US 12,536,746 B2
(45) Date of Patent: Jan. 27, 2026

(54) VIRTUAL ORGANOID GENERATION METHOD

(71) Applicant: NEXT & BIO INC., Seoul (KR)

(72) Inventors: Ji Hun Yang, Seoul (KR); Eui Jeong Song, Seoul (KR); Tae Hwan Kwak, Yongin-si (KR); Si Young Lee, Iksan-si (KR)

(73) Assignee: NEXT & BIO INC., Seoul (KR)

( * ) Notice: Subject to any disclaimer, the term of this patent is extended or adjusted under 35 U.S.C. 154(b) by 157 days.

(21) Appl. No.: 18/577,140

(22) PCT Filed: May 6, 2022

(86) PCT No.: PCT/KR2022/006454
§ 371 (c)(1),
(2) Date: Jan. 5, 2024

(87) PCT Pub. No.: WO2023/282452
PCT Pub. Date: Jan. 12, 2023

(65) Prior Publication Data
US 2025/0037373 A1    Jan. 30, 2025

(30) Foreign Application Priority Data
Jul. 9, 2021   (KR) .................. 10-2021-0090432

(51) Int. Cl.
*G06T 17/10*   (2006.01)
(52) U.S. Cl.
CPC .................. *G06T 17/10* (2013.01)

(58) Field of Classification Search
CPC ................ G06T 17/10; G06T 2210/41; G06T 2219/2021; G06T 19/20; G06T 15/08; G06T 19/003; G06T 2207/30024
See application file for complete search history.

(56) References Cited

U.S. PATENT DOCUMENTS 7,767,154 B2   8/2010   Nichols
8,642,339 B2   2/2014   Sato
(Continued)

FOREIGN PATENT DOCUMENTS

CN   102257123 A   11/2011
CN   106459925 A   2/2017
(Continued)

OTHER PUBLICATIONS

Written Opinion (WO) for PCT/KR2022/006454 mailed Aug. 17, 2022 (6 pages).
(Continued)

*Primary Examiner* — Haixia Du
(74) *Attorney, Agent, or Firm* — Shumaker, Loop & Kendrick, LLP

(57) ABSTRACT

The present specification provides: a method for generating a virtual organoid having various shapes and features; and a virtual organoid imaging method capable of obtaining the same effect as image data obtained from an actual organoid. The virtual organoid generation method according to the present specification may generate data relating to an organoid structure in a virtual space so as to apply the feature of an actual organoid. The imaging method using the virtual organoid according to the present specification enables generation of image data which can obtain the same effect as capturing an image of an actual organoid.

9 Claims, 9 Drawing Sheets

(56) References Cited

U.S. PATENT DOCUMENTS

| | | | |
|---|---|---|---|
| 9,922,421 | B1* | 3/2018 | Degani .................. G06T 7/0012 |
| 2009/0010507 | A1 | 1/2009 | Geng |
| 2010/0221768 | A1 | 9/2010 | Akai et al. |
| 2011/0003389 | A1 | 1/2011 | Nakazawa |
| 2011/0311144 | A1 | 12/2011 | Tardif |
| 2013/0135292 | A1 | 5/2013 | Lee et al. |
| 2013/0174287 | A1 | 7/2013 | Higuera |
| 2015/0232673 | A1 | 8/2015 | Jing |
| 2017/0081625 | A1 | 3/2017 | Wikswo |
| 2017/0253844 | A1 | 9/2017 | Fang |
| 2018/0187136 | A1 | 7/2018 | Lichtenberg |
| 2018/0255240 | A1 | 9/2018 | Kato |
| 2019/0001046 | A1 | 1/2019 | Matheu |
| 2019/0194611 | A1 | 6/2019 | Jo |
| 2019/0258846 | A1 | 8/2019 | Dinov |
| 2020/0001781 | A1 | 1/2020 | Apfel |
| 2020/0217462 | A1 | 7/2020 | Mitsuzuka |
| 2020/0300750 | A1 | 9/2020 | Eshel |
| 2021/0272378 | A1* | 9/2021 | Stomakhin .............. G06T 19/20 |
| 2022/0154140 | A1 | 5/2022 | Chung et al. |
| 2022/0275328 | A1 | 9/2022 | Chung |

FOREIGN PATENT DOCUMENTS

| | | |
|---|---|---|
| CN | 108456642 A | 8/2018 |
| CN | 111337775 A | 6/2020 |
| EP | 2173853 B1 | 4/2010 |
| EP | 3150704 A1 | 4/2017 |
| EP | 3129144 B1 | 2/2019 |
| JP | 2011167101 A | 9/2011 |
| JP | 2012157267 A | 8/2012 |
| JP | 2017506066 A | 3/2017 |
| KR | 2019790001973 Y1 | 11/1979 |
| KR | 20100088297 A | 8/2010 |
| KR | 20130013537 A | 2/2013 |
| KR | 20140113139 A | 9/2014 |
| KR | 20160017036 A | 2/2016 |
| KR | 20160115764 A | 10/2016 |
| KR | 20160117631 A | 10/2016 |
| KR | 20170003177 A | 1/2017 |
| KR | 20170010857 A | 2/2017 |
| KR | 20170040442 A | 4/2017 |
| KR | 20170056241 A | 5/2017 |
| KR | 20170073696 A | 6/2017 |
| KR | 20180115236 A | 10/2018 |
| KR | 20180136410 A | 12/2018 |
| KR | 20200051481 A | 5/2020 |
| KR | 20200081294 A | 7/2020 |
| KR | 20200081295 A | 7/2020 |
| WO | 2013047655 A1 | 4/2013 |
| WO | 2014196204 A1 | 12/2014 |
| WO | 2015182159 A | 12/2015 |
| WO | 2015182159 A1 | 12/2015 |
| WO | 2016069917 A1 | 5/2016 |
| WO | 2016103002 A1 | 6/2016 |
| WO | 2016203748 A1 | 12/2016 |
| WO | 2017060884 A1 | 4/2017 |
| WO | 2018011558 A1 | 1/2018 |
| WO | 2018196472 A1 | 11/2018 |
| WO | 2019145847 A1 | 8/2019 |
| WO | 2019203255 A1 | 10/2019 |

OTHER PUBLICATIONS

International Preliminary Report on Patentability for PCT/KR2022/006454 dated Dec. 14, 2023 (8 pages).
International Search Report for PCT/KR2022/006454 mailed Aug. 17, 2022 (7 pages).
Wayne Lewis "Artificial Intelligence Converts 2D Images Into 3D Using Deep Learning" [Video]. SciTech Daily. Nov. 9, 2019 (9 pages).
Kh Tohidul Islam et al., "A deep learning based framework for the registration of three dimensional multi-modal medical images of the head." Scientific Reports. Jan. 21, 2021 (13 pages).
Non-Final Office Action Issued on Aug. 26, 2025 In Related U.S. Appl. No. 17/628,719 (17 Pages).
English translation of KR Office Action ("KR OA") for KR App. No. 10-2021-0090432 mailed Apr. 23, 2024 (7 pages).
Michele Zanoni et al. "Modeling neoplastic disease wiht spheroids and organoids" Journal of Hematology & Oncology, 13:97 (2020) (15 pages).
Non-Final Office Action Issued in Corresponding U.S. Appl. No. 17/628,719 on May 12, 2025 (32 Pages).
Yuguo Lei et al. "A fully defined and scalable 3D culture system for human pluripotent stem cell expansion and differentiation", PNAs, p. E5039-E5048, published online Nov. 18, 2013; accessed at www.pnas.org/cgi/doi/10.1073/pnas.1309408110.
International Search Report for PCT/KR2020/008242 mailed Mar. 24, 2021 (6 pages).
Kazutoshi Takahashi et al Induction of Pluripotent Stem Cells From Mouse Embryonic and Adult Fibroblast Cultures By Defined Factors Cell vol. 126 p. 663-676 Aug. 26, 2006.
Kazutoshi Takahashi et al Induction of Pluripotent Stem Cells From Adult Human Fibroblasts By Defined Factors Cell vol. 131, p. 861-872 Nov. 30, 2007.
M. Lancaster et al 'Generation of Cerebral Organoids From Human Pluripotent Stem Cells' Natural Protocols, vol. 9 No. 10, p. 2329-2340 Sep. 4, 2014.
International Search Report for PCT/KR2020/008271 mailed Mar. 23, 2021 (5 pages).
International Search Report for PCT/KR2020/008274 mailed Mar. 23, 2021 (7 pages).
International Search Report for PCT/KR2020/008280 mailed Mar. 24, 2021 (6 pages).
International Search Report for PCT/KR2020/008285 mailed Mar. 24, 2021 (6 pages).
European Search Report (ESR) for EP Pat. App. 20941637.9 mailed Feb. 26, 2024 (17 pages).
English translation of JP Office Action ("JP OA") for JP Pat. App. 2023-053903 mailed May 7, 2024 (4 pages).
English translation of JP Office Action ("JP OA") for JP Pat. App. 2022-580485 mailed May 21, 2024 (3 pages).
English translation of CN Office Action ("CN OA") for CN Pat. App. 202080057825.0 mailed Nov. 29, 2024 (9 pages).
English translation of JP Office Action ("JP OA") for JP Pat. App. 2022-58053 mailed Jul. 2, 2024 (4 pages).
English translation of JP Office Action ("JP OA") for JP Pat. App. 2022-580506 mailed Mar. 12, 2024 (5 pages).
English translation of JP Office Action ("JP OA") for JP Pat. App. 2022-580503 mailed Jan. 7, 2025 (2 pages).
Non-Final Office Action (NFOA) for U.S. Appl. No. 17/628,719, mailed Mar. 3, 2025 (16 pages).
Anonymous: "GravityPLUS(TM) Hanging" Dec. 31, 2015.
Sebastien Sart et al. "Three-Dimensional Aggregates", Tissue Engineering Part B, vol. 20, No. 5 (Oct. 1, 2014) p. 365-380.
Mark D Ungrin et al. "Rational bioprocess design" Biotechnology and Bioengineering, John Wiley, Hoboken USA vol. 109, No. 4, p. 853-866 (Dec. 2, 2011 ).
Tomomi G. Otsuji et al. "A 3D Sphere Culture System" Stem Cell Reports, vol. 2, No. 5. p. 734-745 (May 1, 2014).
Screen Application Note vol. 2, Jun. 2017, URL <http://screencell3imager.com/assets/pdf/application/rm/rm-4.pdf>, Searched on May 14, 2024.
Apr. 7, 2025 Non-Final Rejection issued in U.S. Appl. No. 17/629,034.
Amin ND, Pasca SP. Building Models of Brain Disorders with Three-Dimensional Organoids. Neuron. Oct. 24, 2018;100 (2):389-405.
Comley, John. "Spheroids." Drug Discovery (2017): 31.
Lancaster MA, Renner M, Martin CA, Wenzel D, Bicknell LS, Hurles ME, Homfray T, Penninger JM, Jackson AP, Knoblich JA. Cerebral organoids model human brain development and microcephaly. Nature. Sep. 19, 2013;501 (7467):373-9. doi: 10.1038/ nature12517. Epub Aug. 28, 2013. PMID: 23995685; PMCID: PMC3817409. (Year: 2013).
Chinese Office Action dated Mar. 8, 2024 (First Page Translation).
Non-Final Office Action Issued in Corresponding U.S. Appl. No. 17/628,710 on May 1, 2025 (13 Pages).

(56) References Cited

OTHER PUBLICATIONS

Chung, Seok, Ji Hoon Yang, Kyu Hwan Na, Yong Hun Jung "Brain Organoid Manufacturing Method". U.S. Appl. No. 17/629,034 Earliest Effective Filing Date: Jan. 21, 2022 (Year: 2022).
Written Opinion (WO) for PCT/KR2021/095129 mailed Apr. 8, 2022 (8 pages).
International Search Report for PCT/KR2021/095129 mailed Apr. 8, 2022 (5 pages).
Final Office Action issued in U.S. Appl. No. 18/115,985 issued on Sep. 30, 2025 (16 Pages).
Non-Final Office Action issued in U.S. Appl. No. 18/577,155 issued on Sep. 11, 2025 (22 Pages).

* cited by examiner

[Fig. 1]
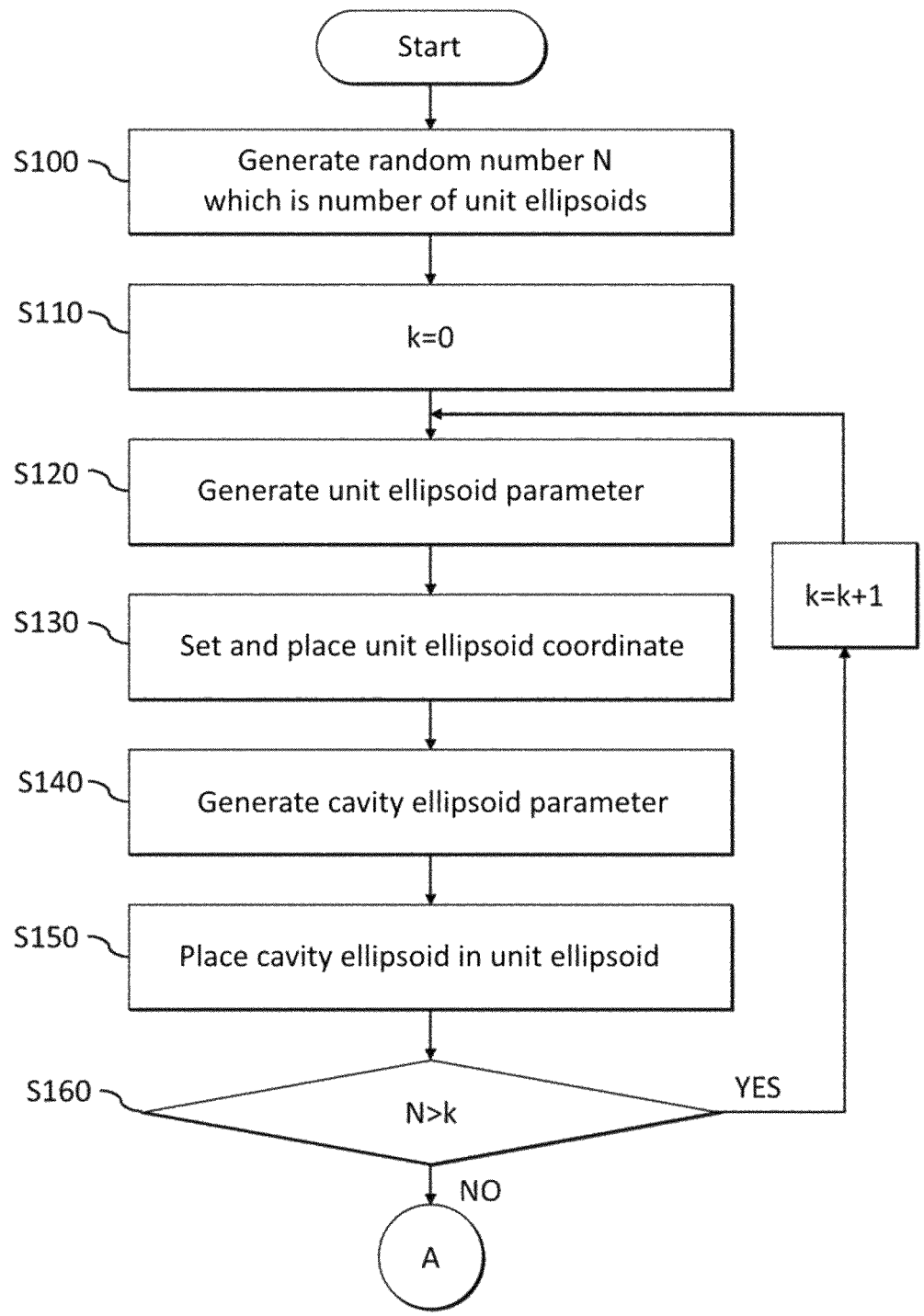

[Fig. 2]
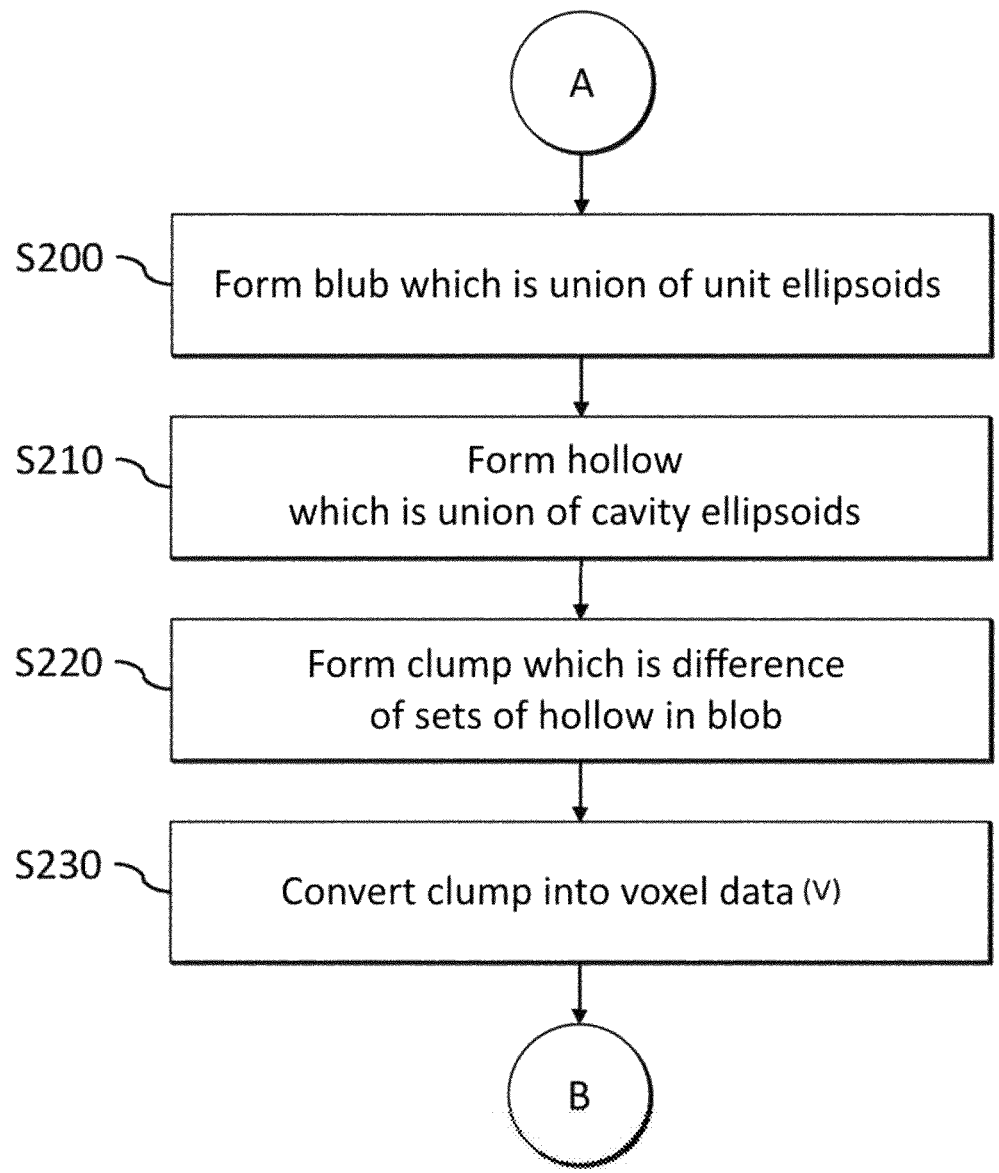

[Fig. 3]
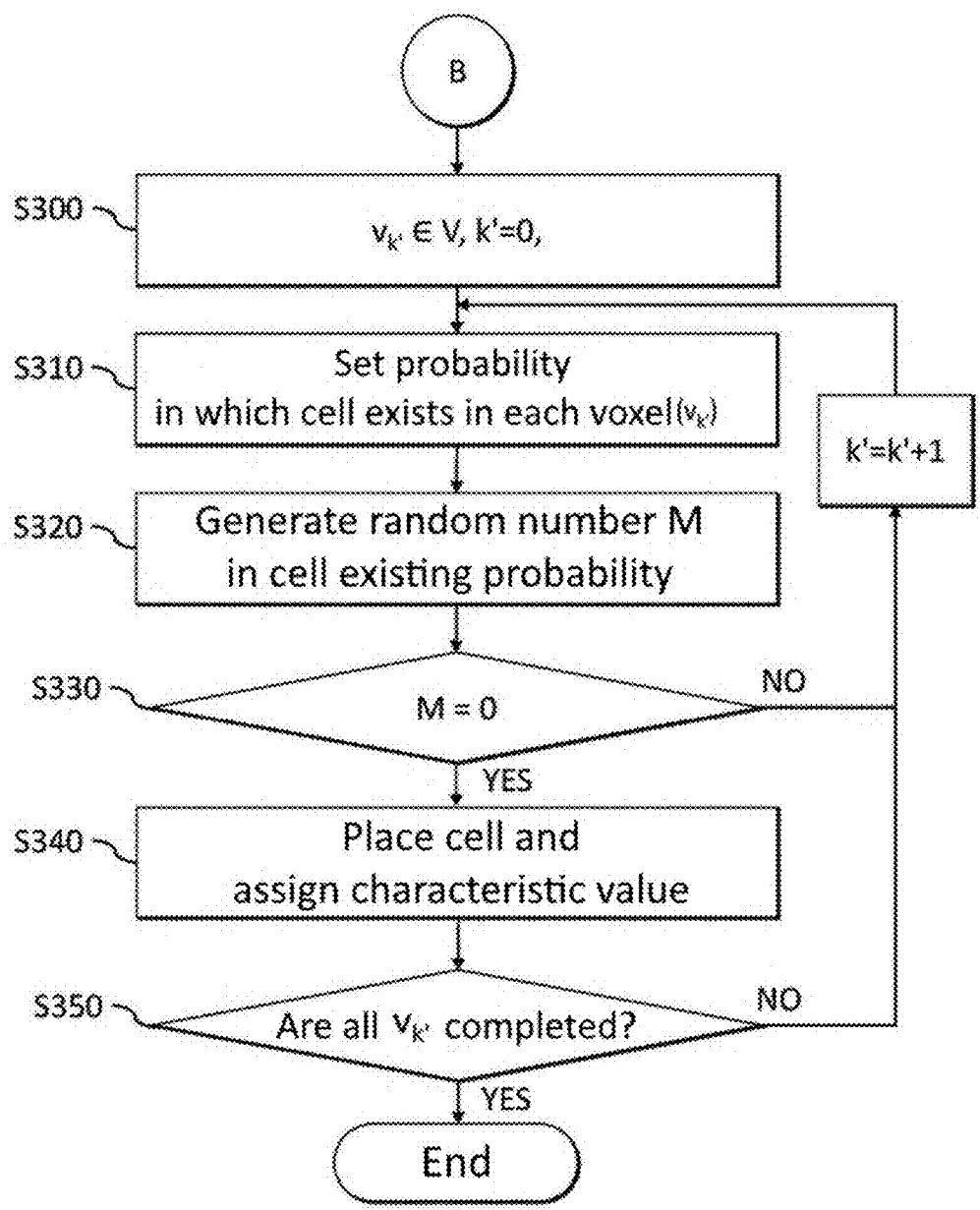

[Fig. 4]
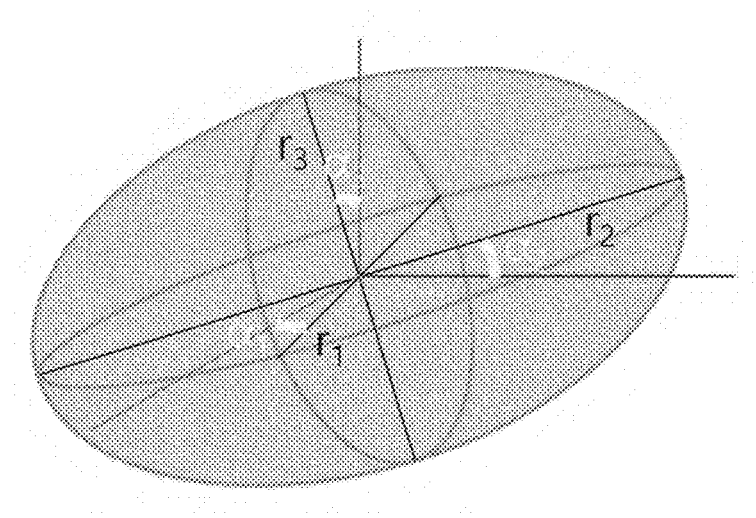
[Fig. 5]
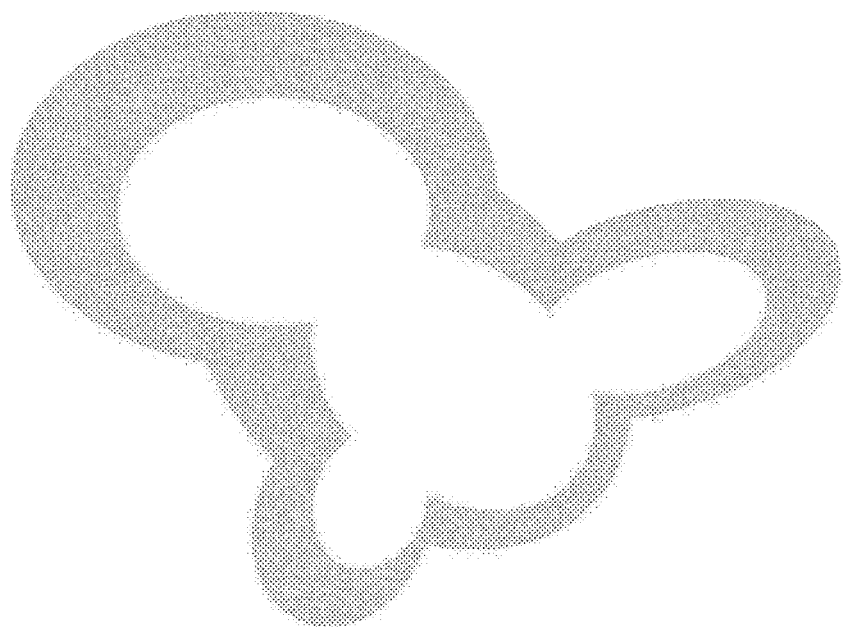

[Fig. 6]
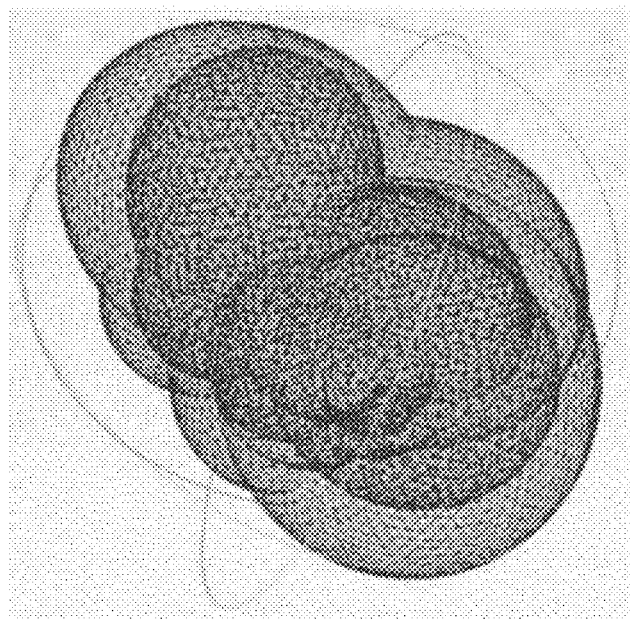
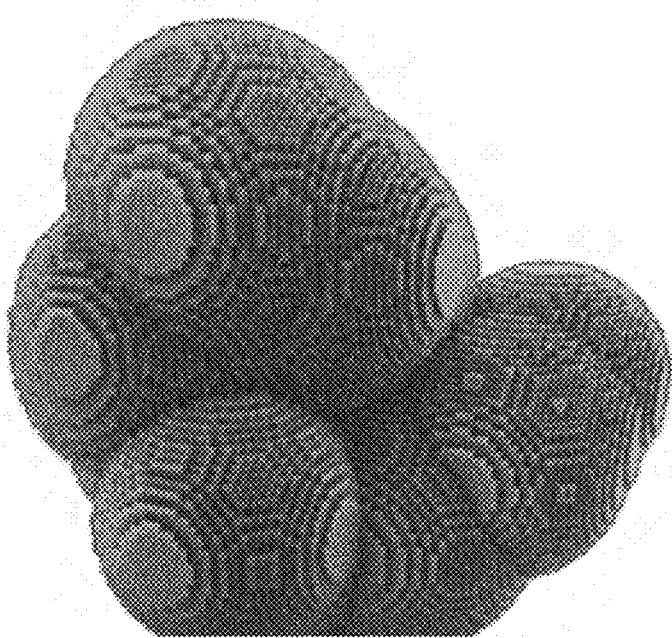

[Fig. 7]
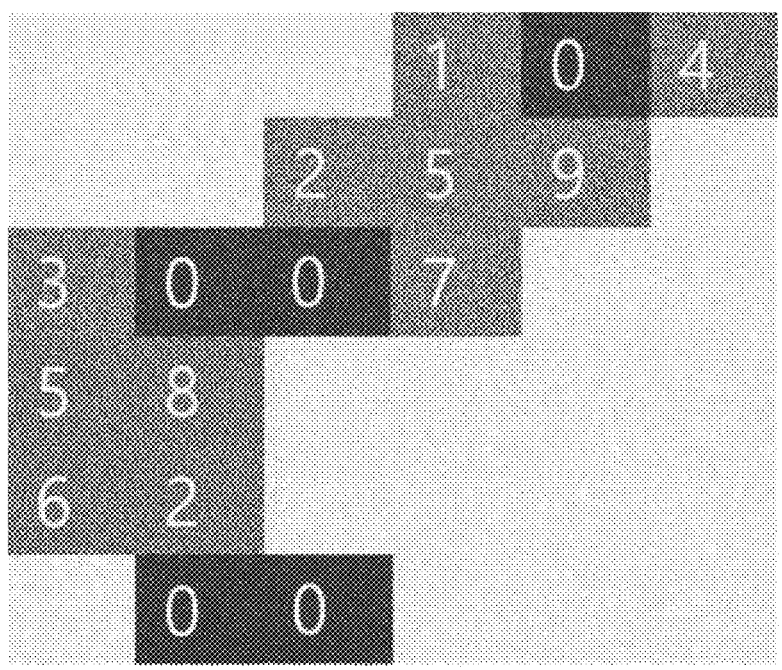

[Fig. 8]
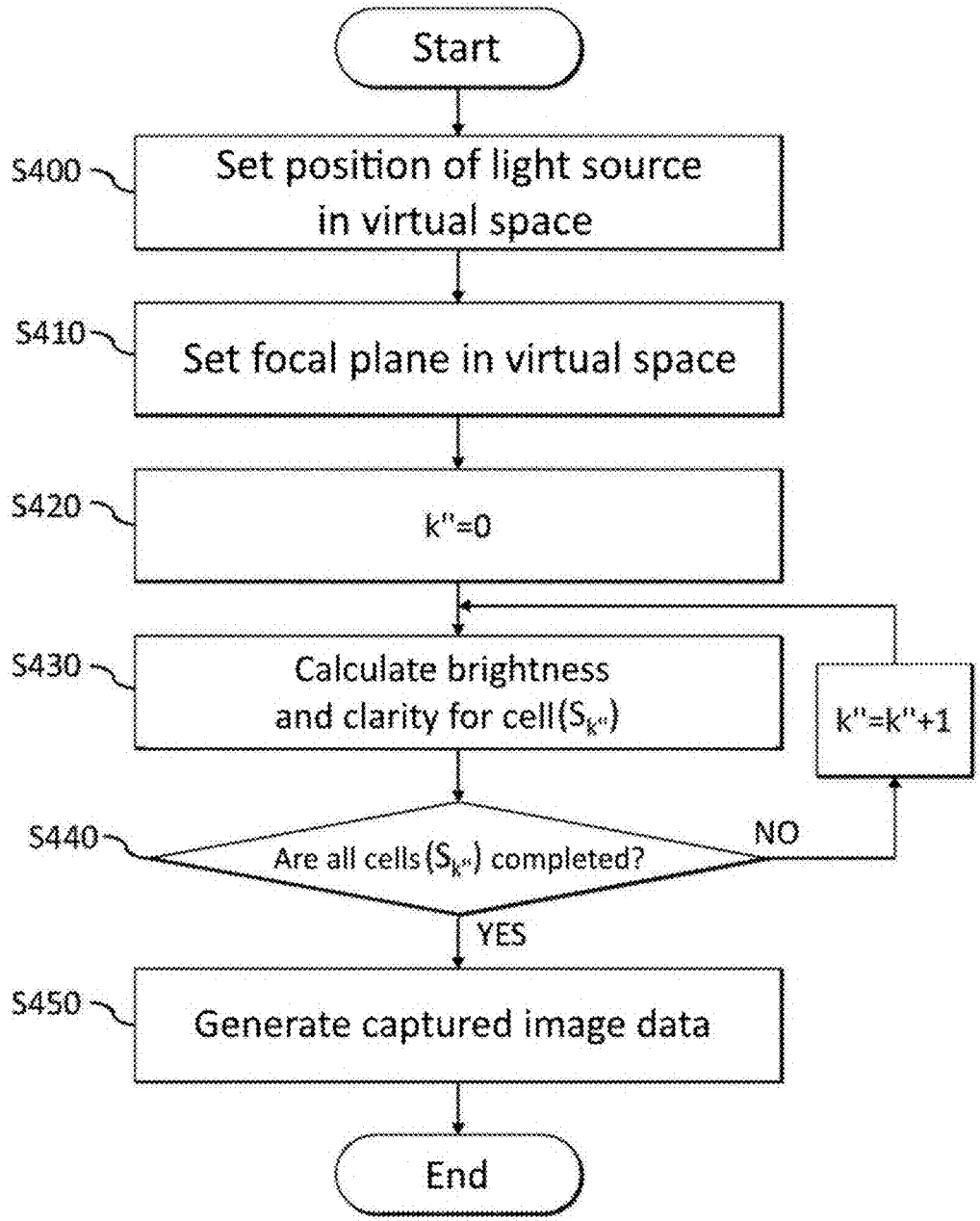

[Fig. 9]
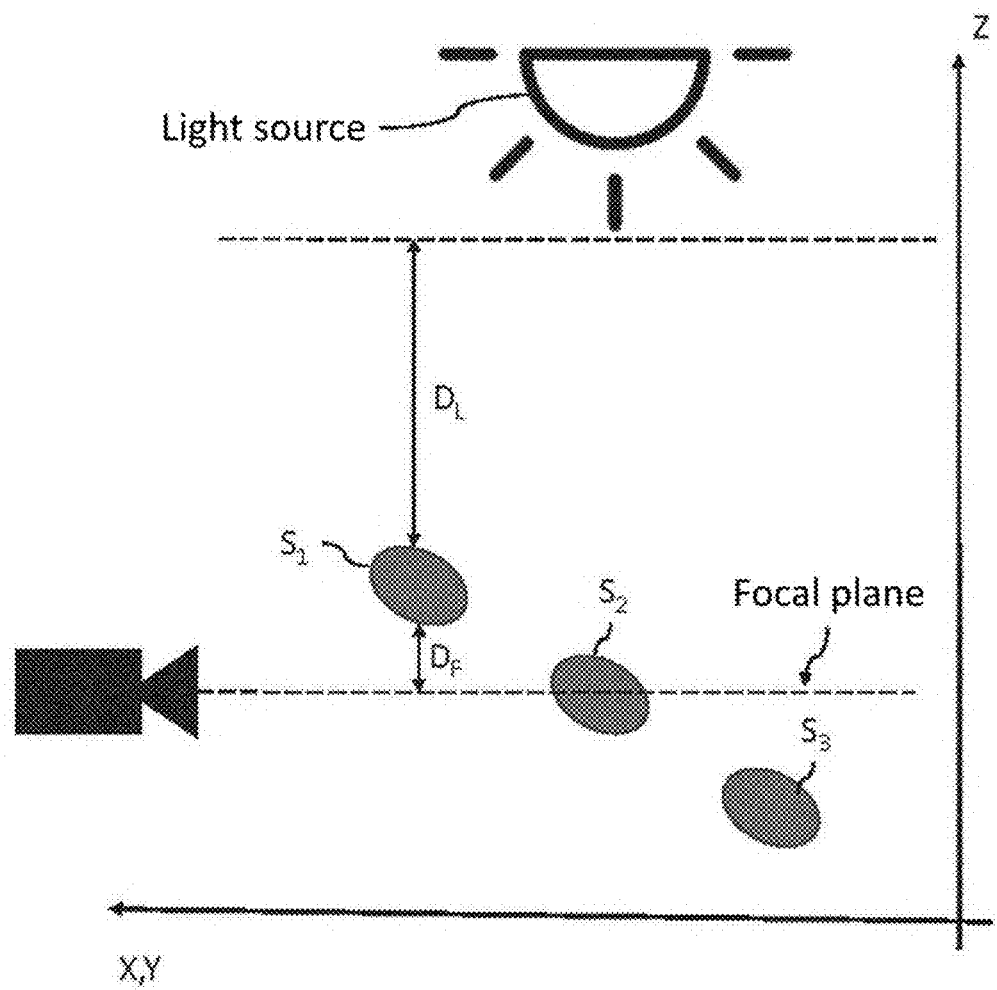

[Fig. 10]
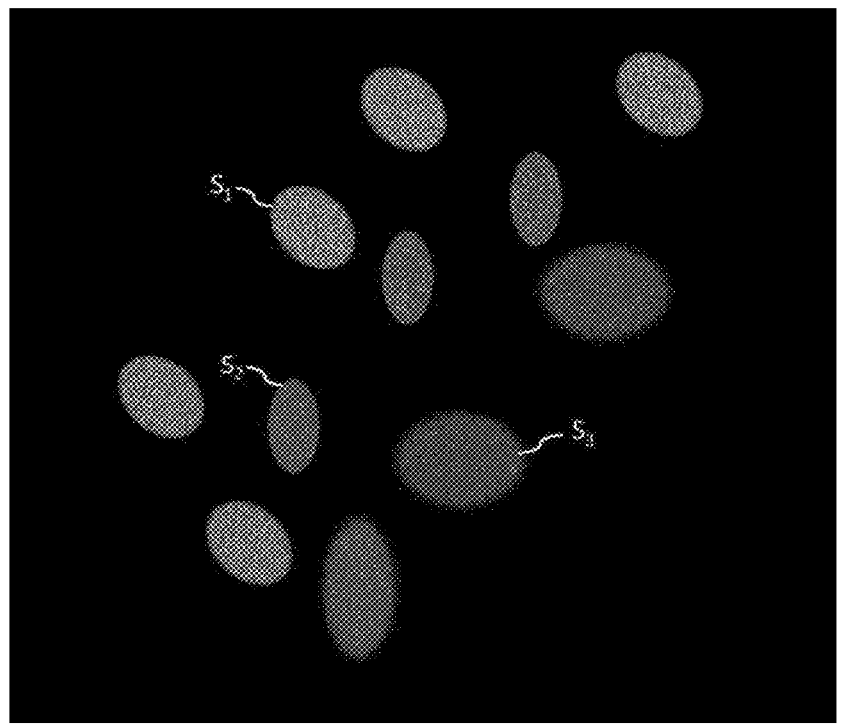
[Fig. 11]
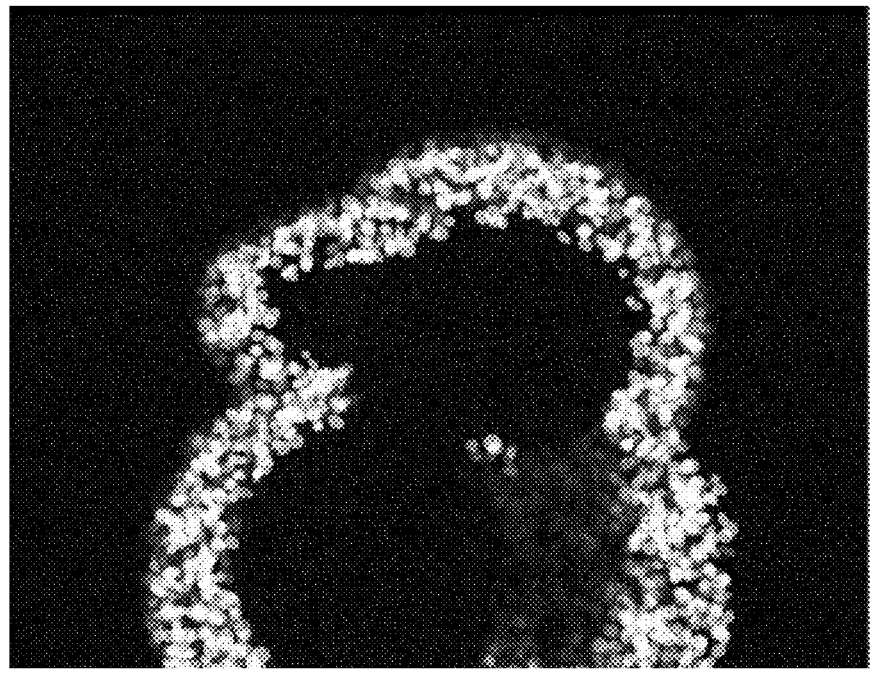

VIRTUAL ORGANOID GENERATION METHOD

TECHNICAL FIELD

The present disclosure relates to virtual data generation, and more particularly, to a method for generating virtual organoid data.

BACKGROUND ART

The contents described in this part merely provide background information on the exemplary embodiment of the present specification, but do not necessarily constitute the related art.

Organoids are referred to as "organ analogues" or "pseudo-organs" and are organ-specific cell aggregates produced by agglomerating and recombining cells isolated from stem cells or organ-derived cells using a three-dimensional culture method. The organoid includes specific cells of a model organ and reproduces specific functions of the organ, and may be spatially organized in a form similar to an actual organ.

It has been reported that a patient-derived tumor organoid shows characteristics of cancer cells or cancer tissues of a patient and also reproduces a genetic mutation characteristic of the cancer tissue of the patient. Recently, a high-throughput screening technique which is combined with a much more stable and physiological patient-derived organoid has been developed to be used for early drug discovery programs and toxicity screening.

The organoid, which is used in cell therapy, bio tissue engineering, new drug development, toxicology, and even precise medical fields requires analysis data for a large amount of organoids to increase the utility. Specifically, in the recently developing artificial intelligence field, a vast amount of learning data is required to train an artificial intelligence model. However, there is a problem in that it takes a lot of time and cost to fill the vast amount of learning data with only analysis data on actual organoids.

RELATED ART DOCUMENT

Patent Document (Patent document 1) Korean Unexamined Patent Application Publication No. 10-2020-0081295, Jul. 7, 2020

Disclosure

Technical Problem

An object of the present specification is to provide a method for generating a virtual organoid having various shapes and features.

An object of the present specification is to provide a virtual organoid imaging method capable of obtaining the same effect as image data obtained by capturing an actual organoid.

Objects of the present disclosure are not limited to the above-mentioned objects, and other objects, which are not mentioned above, can be clearly understood by those skilled in the art from the following descriptions.

Technical Solution

In order to achieve the above-described object, according to the present specification, a virtual organoid generation method is a method for generating an organoid in a virtual three-dimensional space, including: (a) a step of generating a random number and generating unit ellipsoids as many as the generated random number; (b) a step of placing a center point of each unit ellipsoid generated in the step (a) by setting an arbitrary coordinate in a three-dimensional space; (c) a step of generating cavity ellipsoids in which center points are present in each unit ellipsoid as many as the number of unit ellipsoids; (d) a step of generating mass data by removing a set of the cavity ellipsoids from a set of the unit ellipsoids; (e) a step of converting the mass data into voxel data according to a predetermined resolution; and (f) a step of randomly placing cells for the voxel, performed by a processor.

According to the exemplary embodiment of the present specification, the step (a) may be a step of generating a length of a diameter and a rotational angle for each of three axes orthogonal to each other with a center point of each unit ellipsoid as an origin by the random number.

According to the exemplary embodiment of the present specification, the step (b) may be a step of placing a center point to locate the boundary of each unit ellipsoid in a virtual three-dimensional space.

According to the exemplary embodiment of the present specification, the step (c) may be a step of generating a length of a diameter and a rotational angle for each of three axes orthogonal to each other with a center point of each cavity ellipsoid as an origin by the random number.

According to the exemplary embodiment of the present specification, the step (f) may include: (f-1) a step of setting a probability that a cell exists in each voxel; and (f-2) a step of determining whether to place the cell according to the set probability that a cell exists in each voxel.

According to the exemplary embodiment of the present specification, when there are two or more different cells, the step (f-1) may be a step of setting a probability such that only any one of two or more cells exists in each voxel.

The virtual organoid generation method according to the present specification may further include (g) a step of assigning a characteristic value of the placed cell.

According to the exemplary embodiment of the present specification, the step (g) may be a step of assigning at least one characteristic value of a size, a shape, and a staining degree of a cell.

The virtual organoid generation method according to the present specification may be implemented as a computer program which is created to perform each step of the virtual organoid generation method in the computer to be recorded in a computer readable recording medium.

In order to achieve the above-described object, according to the present specification, a virtual organoid generation device is a device for generating an organoid in a virtual three-dimensional space, including: a processor which generates a random number, generates unit ellipsoids as many as the generated random number; places a center point of each generated unit ellipsoid by setting an arbitrary coordinate in a three-dimensional space, generates cavity ellipsoids in which center points are present in each unit ellipsoid as many as the number of unit ellipsoids; generates mass data by removing a set of the cavity ellipsoids from a set of the unit ellipsoids; converts the mass data into voxel data according to a predetermined resolution, and randomly places cells for the voxel.

In order to achieve the above-described object, according to the present specification, a captured image data generation method using a virtual organoid is a method for generating captured image data using a virtual organoid generated in a virtual three-dimensional space including: (a) a step of setting a position of a light source in a virtual three-dimensional space, (b) a step of setting a focal plane in the virtual three-dimensional space, (c) a step of calculating a brightness and a clarity of each cell in a virtual organoid by considering a position of the light source and a position of the focal plane; and (d) a step of generating captured image data of a virtual organoid to which the calculated brightness and clarity of the cell are reflected, performed by a processor.

According to the exemplary embodiment of the present specification, the step (a) may be a step of setting the light source to be located in an upper portion in the Z-axis direction from a center region of the virtual organoid.

According to the exemplary embodiment of the present specification, the step (b) may be a step of setting the focal plane to be located in the boundary plane of the virtual organoid.

Desirably, the step (b) may be a step of setting the normal line of the focal plane to be parallel to the Z-axis of the virtual three-dimensional space.

According to the exemplary embodiment of the present specification, the step (c) may be a step of calculating the brightness of the cell to be inversely proportional to a square of a distance between the light source and each cell and the clarity of the cell to be inversely proportional to a square of a distance between each cell and the focal plane.

In this case, the step (c) may be a step of calculating the brightness and the clarity of the cell further considering the staining degree of the cell.

The captured image data generation method using a virtual organoid according to the present specification may be implemented as a computer program which is created to perform each step of the captured image data generation method using a virtual organoid in the computer to be recorded in a computer readable recording medium.

In order to achieve the above-described object, according to the present specification, a captured image data generation device using a virtual organoid is a device for generating captured image data using a virtual organoid generated in a virtual three-dimensional space including a processor which sets a position of a light source in a virtual three-dimensional space, sets a focal plane in a virtual three-dimensional space, calculates a brightness and a clarity of each cell in a virtual organoid by considering a position of the light source and a position of the focal plane, and generates captured image data of a virtual organoid to which the calculated brightness and clarity of the cell are reflected.

Other detailed matters of the present disclosure are included in the detailed description and the drawings.

Advantageous Effects

According to an aspect of the present specification, a virtual organoid having various forms and features may be quickly and easily generated.

According to another aspect of the present disclosure, captured data of a virtual organoid capable of obtaining the same effect as image data obtained by capturing an actual organoid may be obtained.

According to another aspect of the present disclosure, a vast amount of captured image data using a virtual organoid may be ensured and the vast amount of captured image data may be utilized for various purposes, such as learning data of artificial intelligence.

The effects of the present disclosure are not limited to the technical effects mentioned above, and other effects which are not mentioned can be clearly understood by those skilled in the art from the following description.

DESCRIPTION OF DRAWINGS

FIGS. 1 to 3 are flowcharts of a method for generating a virtual organoid according to the present specification.

FIG. 4 is a reference view of a unit ellipsoid.

FIG. 5 is a reference view of mass data of a virtual organoid.

FIG. 6 is a reference view for voxelization.

FIG. 7 is a reference view for random cell placement in a voxel.

FIG. 8 is a flowchart of a method for generating captured image data using a virtual organoid according to the present specification.

FIG. 9 is a reference view for calculating brightness and clarity of a cell.

FIG. 10 is an example of a captured image of a virtual organoid.

FIG. 11 is another example of a captured image of a virtual organoid.

MODES OF THE INVENTION

Advantages and characteristics of the present disclosure disclosed in the present specification, and a method of achieving the advantages and characteristics will be clear by referring to exemplary embodiments described below in detail together with the accompanying drawings. However, the present specification is not limited to exemplary embodiments disclosed herein but will be implemented in various different forms. The exemplary embodiments are provided by way of example only so that a person with ordinary skill in the art (hereinafter, referred to as "a person skilled in the art") in the technical field to which the present specification pertains can fully understand the disclosures of the present specification and the scope of the present specification. Therefore, the present specification will be defined only by the scope of the appended claims.

The terms used in the present specification are for explaining the embodiments rather than limiting the scope of the present specification. Unless particularly stated otherwise in the present specification, a singular form also includes a plural form. The term "comprise" and/or "comprising" used in the specification does not exclude the presence or addition of one or more other components in addition to the mentioned component.

Like reference numerals generally denote like elements throughout the specification and "and/or" includes each of the mentioned components and all combinations of one or more components. Although the terms "first", "second", and the like are used for describing various components, these components are not confined by these terms. These terms are merely used for distinguishing one component from the other components. Therefore, a first component to be mentioned below may be a second component in a technical spirit of the present disclosure.

Unless otherwise defined, all terms (including technical and scientific terms) used in the present specification may be used as the meaning which may be commonly understood by the person with ordinary skill in the art, to which the present disclosure belongs. It will be further understood that terms defined in commonly used dictionaries should not be interpreted in an idealized or excessive sense unless expressly and specifically defined.

A process of manufacturing an organoid which is an organ-specific aggregate by extracting cells and culturing the extracted cells requires a process of inspecting whether the manufactured organoid is spatially organized in a form similar to an actual organ. To this end, a representative method is to directly observe the organoid, but a method using an artificial intelligence is considered to quickly inspect a large amount of organoids.

The artificial intelligence for inspecting or determining the organoid requires a function to determine whether the organoid has a desired shape or which feature is included in the organoid when an image obtained by capturing the organoid is input. In order to implement this function, a large amount of image data about various organoids for training an organoid inspection or determination model is necessary. However, in order to train the artificial intelligence model using image data obtained by capturing the actual organoid, an astronomical amount of time and cost is consumed. However, the applicant paid attention to the virtual organoid to overcome this disadvantage. Various virtual organoids to which characteristics of the actual organoid are reflected are generated and captured image data is generated from the virtual organoid, just like the capturing of the actual organoid, to generate a large amount of image data for training the artificial intelligence model. When the organoid inspection or determination model is trained using the image data created as described above, as compared with the learning using the actual organoid capturing image, the time and the cost may be significantly reduced and the performance of the artificial intelligence may also be significantly improved.

Hereinafter, the method for generating a virtual organoid and a method for generating captured image data using a virtual organoid described above will be described with reference to the accompanying drawings.

<Method for Generating Virtual Organoid>

FIGS. 1 to 3 are flowcharts of a method for generating a virtual organoid according to the present specification.

The method for generating a virtual organoid according to the present specification may be roughly divided into three steps of i) generating unit ellipsoids and cavity ellipsoids, ii) generating organoid masses, and iii) placing cells. The virtual organoid according to the present specification is virtual data which imitates an actual organoid in a virtual three-dimensional space and the method for generating a virtual organoid may be implemented in the form of a computer program which can be executed in a computer. Accordingly, when the method for generating a virtual organoid according to the present specification is explained, processing, calculating, outputting, and various logics of each step will be explained as being executed by a processor which is known in the technical field to which the present disclosure pertains. The processor may include a microprocessor, a CPU, an application-specific integrated circuit (ASIC), another chip set, a logic circuit, a register, a communication modem, a data processing device, and the like in the field of computer technology. When the method for generating a virtual organoid according to the present specification is implemented by software, the processor may be implemented as a set of program modules. At this time, the program module may be stored in the memory device and may be executed by the processor.

First, referring to FIG. 1, in step S100, the processor may generate a random number N. The random number N corresponds to the number of unit ellipsoids to be generated later.

In next step S110, the processor may set a variable k and input "k=0" as an initial value. The variable k is a variable for repeating the process of generating the unit ellipsoids N times.

In next step S120, the processor may generate a parameter of a unit ellipsoid. The parameter of the unit ellipsoid refers to a length of a diameter from a center point and a degree of inclination (rotational angle) from the central axis. FIG. 4 is a reference view of a unit ellipsoid. Referring to FIG. 4, r1 (a radius of an x-axis), r2 (a radius of a y-axis), r3 (a radius of a z-axis), a1 (an x-axis reference rotational angle), a2 (a y-axis reference rotational angle), and a3 (a z-axis reference rotational angle) may be identified. According to the exemplary embodiment of the present specification, in step S120, the processor may generate the lengths (r1, r2, and r3) of the diameter and rotational angles (a1, a2, and a3) for the three axes orthogonal to each other with the center point of each unit ellipsoid as the origin, using random numbers.

In next step S130, the processor may place the center point of each generated unit ellipsoid by setting an arbitrary coordinate ($x_k$, $y_k$, and $z_k$) in the three-dimensional space. At this time, each processor may place the center point such that a boundary of each unit ellipsoid is present in a virtual three-dimensional space. That is, loss of the part of the ellipsoid caused when a part of the ellipsoid is present at the outside of the virtual three-dimensional space may be prevented.

In next step S140, the processor may generate a parameter of a cavity ellipsoid. In step S150, the processor may place the cavity ellipsoid in the unit ellipsoid. Accordingly, the number of cavity ellipsoids is equal to N which is the number of unit ellipsoids, and each cavity ellipsoid may correspond to each unit ellipsoid one to one. In the present specification, the cavity ellipsoid is data which is generated to form a hollow in the virtual organoid and the hollow will be described below. Like the parameter of the unit ellipsoid, as the parameter of the cavity ellipsoid, the processor may generate a length of a diameter (r'1 (a radius of an x-axis), r'2 (a radius of a y-axis), and r'3 (a radius of a z-axis)) and rotational angles (a'1 (an x-axis reference rotational angle), a'2 (a y-axis reference rotational angle), and a'3 (a z-axis reference rotational angle)) for the three axes orthogonal to each other with the center point of each cavity ellipsoid as the origin, using random numbers.

In the meantime, the center point of the unit ellipsoid and the center point of the cavity ellipsoid do not need to match. That is, the center point of the unit ellipsoid may be different from the center point of the cavity ellipsoid, and it is sufficient if the center point of the cavity ellipsoid is located in the unit ellipsoid. The processor may generate a distance degree ($dx_k$, $dy_k$, and $dz_k$) from the center points ($x_k$, $y_k$, and $z_k$) of the unit ellipsoid by generating the random number and the center point of the cavity ellipsoid may be set according to the distance degree.

In the meantime, the entire cavity ellipsoid does not need to be present in the unit ellipsoid. That is, a partial radius of the cavity ellipsoid may be larger than a radius of the unit ellipsoid and a part of an outer boundary of the cavity ellipsoid may pass through the outer boundary of the unit ellipsoid to be present in an outer region of the unit ellipsoid.

In next step S160, the processor may determine whether the variable k is larger than the random number N which is previously generated in step S100. If the variable k is smaller than the random number N ("YES" in step S160), the variable k is increased by one and the processor may go to step S120. Next, steps S120 to S160 may be repeated. The repeated processes may be repeated until a total of N unit ellipsoids are generated. In contrast, if the variable k is larger than the random number N ("NO" of step S160), the step i) of generating a unit ellipsoid and a cavity ellipsoid of the method for generating a virtual organoid according to the present specification ends and then the step ii) of generating organoid masses may be performed.

Referring to FIG. 2, in step S200, the processor may form a blob which is a union of unit ellipsoids. In step S210, the processor may form a hollow which is a union of cavity ellipsoids. In step S220, the processor may form a clump which is a difference of sets of the hollow in the blob. That is, the processor may generate mass data by removing a set of the cavity ellipsoids from a set of unit ellipsoids through steps S200 to S220.

FIG. 5 is a reference view of mass data of a virtual organoid.

Referring to FIG. 5, according to the example that N=4, a mass in which four cavity ellipsoid sets are removed from four unit ellipsoid sets may be confirmed. The virtual organoid according to the present specification is formed in a virtual three-dimensional space so that the reference view illustrated in FIG. 4 is understood as a cross-sectional view for explaining that a hollow is formed in mass data. As described above, the process of expressing a mass with a hollow therein using the ellipsoid is to express the virtual organoid to be most similar to the overall appearance of the actual organoid.

In the meantime, even though in FIG. 5, an exemplary embodiment that unit cavities are in contact with each other to form one mass is illustrated, in previous step S120, a size of the unit ellipsoid is randomly determined and in step S130, the position of the unit ellipsoid is randomly disposed so that an example that the unit cavity may be formed by two or more masses separated from each other. Further, the mass data illustrated in FIG. 5 is illustrated that closed space in which an inner space is not connected to an outer space is formed, but the inner space of the mass is not necessarily a closed space. In previous step S140, the size of the cavity ellipsoid is determined and in the process of step S150, a position of the cavity ellipsoid is randomly disposed so that a mass in which the inside and outside of the mass are connected, that is, a partial area is open may also be generated.

In next step S230, the processor may convert the clump, that is, the mass data, into voxel data according to a predetermined resolution. The resolution may be 256×256× 256 and various resolutions may be set according to a performance of equipment of performing the method for generating a virtual organoid according to the present specification or a purpose of the virtual organoid.

FIG. 6 is a reference view for voxelization.

Referring to FIG. 6, an example that a mass on the three-dimensional space is converted into a voxel having an arbitrary resolution may be identified. When the step ii) of generating an organoid mass of the method for generating a virtual organoid according to the present specification ends, the processor may go to the step iii) of placing cells.

Referring to FIG. 3, first, in step S300, the processor may set a variable k' and input k'=0 as an initial value. Further, each voxel is denoted by "$v_k$" and a set of all voxels included in the mass is denoted by "V". The variable k' is a variable for performing steps S310 to S340 of randomly placing cells for all voxels included in V.

In step S310, the processor may set a probability that a cell exists in each voxel ($v_k'$). In steps S320 to S340, the processor may determine whether to place cells according to the set probability that a cell exists in each voxel. For example, when the probability that a cell exists in each voxel is set as 1/10, in step S320, the processor may generate a random number M between 0 and 9 according to the cell existing probability for the voxel ($v_k'$). At this time, when the random number M=0, it is assumed that there is a cell in the corresponding voxel ($v_k'$). In step S330, when the random number M is not 0 ("NO" in step S330), the processor may increase the variable k' by one and go to step S310. Steps S310 to S330 may be repeated. In contrast, in step S330, if the random number M is 0 ("YES in step S330), the processor may go to step S340. In step S340, the processor may process that there is a cell in the voxel ($v_k'$) and a characteristic value of the placed cell may be assigned. The processor may assign at least one of a size, a shape, and a staining degree of a cell as a characteristic value of the cell.

FIG. 7 is a reference view for random cell placement in a voxel.

Referring to FIG. 7, it may be identified that 16 voxels are illustrated, and each voxel is filled with a number. The number may represent the random number M generated for each voxel and in a voxel denoted by the number "0", a cell may be present.

In the meantime, the organoid is configured by only one type of cell, but may also be configured by two or more types of cells. In order to implement the virtual organoid which is configured by two or more types of cells, the processor also may set a probability so that only any one of two or more cells may exist in each voxel in step S310. For example, when a virtual organoid configured by two types of cells is generated, a first cell existing probability may be set to be 1/p and a second cell existing probability may be set to be 1/q. In this case, each voxel may correspond to three cases that a first cell is present (1/p), a second cell is present (1/q), and there is no cell (1-1/p-1/q).

In step S350, the processor may determine whether the placement of the cell for all voxels is determined and may repeat steps S310 to S340. When whether to place the cells for all the voxels is completed, the generation of the virtual organoid may be completed.

<Method for Generating Captured Image Data Using Virtual Organoid>

FIG. 8 is a flowchart of a method for generating captured image data using a virtual organoid according to the present specification.

Similar to the method for generating a virtual organoid which has been described above, the method for generating captured image data using a virtual organoid according to the present specification may be implemented as a computer program which can be executed in the computer. Accordingly, when the method for generating captured image data using a virtual organoid according to the present specification is described, processing, calculating, outputting, and various logics of each step will be described as being executed by a processor which is known in the technical field to which the present disclosure pertains.

Referring to FIG. 8, in step S400, the processor may set a position of a light source in a virtual three-dimensional space. The characteristic value, such as a brightness or a color of the light source may be set in various forms by reflecting an actual capturing environment, a characteristic of the organoid, or the like. The more diverse the characteristics of the light source, the larger the diversity of the image data to be ultimately generated.

Desirably, the processor may set the light source to be located in an upper portion in the Z-axis direction from a center region of the virtual organoid. An environment in which when the actual organoid is captured, a camera captures the organoid placed on a culture plate from vertically upward to downward is considered. In the meantime, the Z-axis in the present specification refers to a coordinate axis parallel to a vertical direction, excluding an X-axis and a Y-axis which are a horizontal direction and a vertical direction, among the X-axis, Y-axis, and Z-axis which are orthogonal to each other.

In next step S410, the processor may set a focal plane in the virtual three-dimensional space. The focal plane is a concept corresponding to a focal distance of a camera. When the actual organoid is captured, some cells are clearly captured and some cells are captured blurry according to the focal distance of the camera. For the same virtual organoid, the larger the variety of the focal plane, the larger the diversity of the image data to be ultimately generated.

Desirably, the processor may set the focal plane to be located in the boundary plane of the virtual organoid. An environment in which if the focal plane is present at the outside of the boundary plane of the virtual organoid, when the actual organoid is captured, all cells are captured blurry is assumed. Accordingly, an environment in which some cells in the organoid are clearly captured and some cells are captured blurry is assumed to desirably set the focal plane into the boundary plane of the virtual organoid.

Moreover, the processor may set the normal line of the focal plane to be parallel to the Z-axis of the virtual three-dimensional space. An environment in which when the actual organoid is captured, a camera captures the organoid placed on a culture plate from vertically upward to downward is considered. However, the method for generating captured image data using a virtual organoid according to the present specification is not necessarily limited to the vertical capturing, and the normal line of a focal plane is possible to be inclined with respect to the Z-axis.

Next, in step S420, the processor may set a variable k" and input "k"=0" as an initial value. The variable k" is a variable for calculating for all the cells $S_k$" in the virtual organoid.

In step S430, the processor may calculate the brightness and the clarity of each cell in the virtual organoid in consideration of the position of the light source and the position of the focal plane.

FIG. 9 is a reference view for calculating brightness and clarity of a cell.

Referring to FIG. 9, three cells S1, S2, and S3, a light source, and a focal plane disposed in the virtual space may be identified. The focal plane is set on the cell S2. The processor may calculate the brightness of each cell to be inversely proportional $(1/D_L^2)$ to the square of the distance between the light source and each cell. The processor may calculate the clarity of each cell to be inversely proportional $(1/D_F^2)$ to the square of the distance between the focal plane and each cell. Moreover, the processor may calculate the brightness and the clarity of the cell further considering the staining degree of a cell. This will be expressed by Equations as below.

$$\text{Brightness of cell}(B) \propto \text{Staining degree}(Ch) \times \frac{1}{D_L^2}$$

$$\text{Clarity of cell}(C) \propto \text{Staining degree}(Ch) \times \frac{1}{D_F^2}$$

In step S440, the processor may determine whether calculation of brightness and clarity for all the cells $S_k$" is completed. If the calculation for all the cells is not completed ("NO" in S440), the processor may repeat steps S430 and S440. In contrast, if the calculation for all the cells is completed ("YES" of S440), the processor may go to step S450.

In step S450, the processor may generate captured image data of the virtual organoid to which the calculated brightness and clarity of the cell are reflected.

FIG. 10 is an example of a captured image of a virtual organoid.

Referring to FIG. 10, images in which three cells S1, S2, and S3 illustrated in FIG. 9 have different brightness and clarities according to a distance between the light source and the focal plane may be identified.

FIG. 11 is another example of a captured image of a virtual organoid.

Referring to FIG. 11, when a hollow is formed inside, an image in which various cells disposed in the boundary region are generated according to the brightness and the clarity may be identified. That is, the method for generating captured image data using a virtual organoid according to the present specification may generate image data which can obtain the same effect as capturing an actual organoid.

However, the exemplary embodiments of the present specification have been described with reference to the accompanying drawings, but those skilled in the art will understand that the present disclosure may be implemented in another specific form without changing the technical spirit or an essential feature thereof. Therefore, it should be understood that the above-described exemplary embodiments are illustrative in all aspects and do not limit the present disclosure.

The above-described program may include a code which is coded by a computer language, such as C/C++, C#, JAVA, Python, or machine language which can be read by the processor CPU of the computer through a device interface of the computer to allow the computer to read the program and execute the method implemented by a program. Such a code may include a functional code related to a function, etc. which defines functions required to execute the above-described methods and include an execution procedure-related control code required for the processor of the computer to execute the functions according to a predetermined procedure. Such a code may further include a memory reference-related code indicating a location (address) of an internal or external memory of the computer where additional information or media required to allow the processor of the computer to execute the above-mentioned functions is referenced. Further, if the processor of the computer requires communication with any other remote computer or server to execute the functions, the code may further include a communication-related code about how to communicate with any other remote computer or server using a communication module of the computer and which information or media needs to be transmitted or received during the communication.

The storage medium refers to a medium that stores data semi-permanently and is readable by the device, rather than a medium that stores data for a short moment, such as registers, caches, and memories. Specifically, examples of the storage medium include a ROM, a RAM, a CD-ROM, a magnetic tape, a floppy disk, an optical data storage device, or the like, but are not limited thereto. That is, the program may be stored in various recording media on various servers accessible by the computer or in various recording media on the computer of the user. Further, the media are distributed to computer systems connected through a network, so that a computer readable code may be stored by a distribution method.

The invention claimed is:

1. A method for generating an organoid in a virtual three-dimensional space, comprising: performed by a processor,
   (a) generating a random positive number and generating unit ellipsoids having same spatial dimension and random parameters as many as the generated random number;
   (b) placing a center point of the each unit ellipsoids generated in the step (a) by setting an arbitrary coordinate in a three-dimensional space;
   (c) generating cavity ellipsoids having the same spatial dimension as the unit ellipsoid and random parameters in which the center point of each cavity ellipsoid is present in the corresponding unit ellipsoid as many as the number of the unit ellipsoids;
   (d) generating mass data by removing a set of the cavity ellipsoids from a set of the unit ellipsoids;
   (e) converting the mass data into voxel data according to a predetermined resolution; and
   (f) randomly placing organoid cells in the voxel data.

2. The virtual organoid generation method of claim 1, wherein the step (a) is generating a length of a diameter and a rotational angle for each of three axes orthogonal to each other with the center point of the each unit ellipsoid as an origin by the random number.

3. The virtual organoid generation method of claim 1, wherein the step (b) is placing the center point to locate a boundary of the each unit ellipsoid in the virtual three-dimensional space.

4. The virtual organoid generation method of claim 1, wherein the step (c) is generating a length of a diameter and a rotational angle for each of three axes orthogonal to each other with the center point of the each cavity ellipsoid as an origin by the random number.

5. The virtual organoid generation method of claim 1, wherein the step (f) includes:

(f-1) setting a probability that the organoid cell exists in the each voxel data; and
(f-2) determining whether to place the organoid cell according to the set probability that the organoid cell exists in the each voxel data.

6. The virtual organoid generation method of claim 5, wherein when there are two or more different organoid cells, the step (f-1) is setting the probability such that only any one of two or more organoid cells exists in the each voxel.

7. The virtual organoid generation method of claim 1, further comprising:
   (g) assigning a characteristic value of the placed organoid cell.

8. The virtual organoid generation method of claim 7, wherein the step (g) is assigning at least one characteristic value of a size, a shape, and a staining degree of the organoid cell.

9. A device for generating an organoid in a virtual three-dimensional space, comprising:
   a processor which generates a random positive number and generates unit ellipsoids having same spatial dimension and random parameters as many as the generated random number, places a center point of the each generated unit ellipsoid by setting an arbitrary coordinate in the three-dimensional space, generates cavity ellipsoids having the same spatial dimension and random parameters as the unit ellipsoid in which the center point of the each cavity ellipsoid is present in the corresponding unit ellipsoid as many as the number of the unit ellipsoids, generates mass data by removing a set of the cavity ellipsoids from a set of the unit ellipsoids, converts the mass data into voxel data according to a predetermined resolution, and randomly places organoid cells in the voxel data.

* * * * *